United States Patent [19]

Grossmann

[11] 4,418,766

[45] Dec. 6, 1983

[54] COMPACT MULTI-SPEED HAMMER-DRILL

[75] Inventor: Horst Grossmann, Huenfelden, Fed. Rep. of Germany

[73] Assignee: Black & Decker Inc., Newark, Del.

[21] Appl. No.: 312,803

[22] Filed: Oct. 19, 1981

Related U.S. Application Data

[63] Continuation-in-part of Ser. No. 297,015, Aug. 28, 1981, abandoned, which is a continuation-in-part of Ser. No. 60,437, Jul. 25, 1979, abandoned.

[51] Int. Cl.³ .................. B23B 45/02; B23B 45/16; B23Q 5/027
[52] U.S. Cl. ..................... 173/13; 173/48; 74/22 R; 74/325
[58] Field of Search ............ 74/22 R, 22 A, 325; 173/13, 48, 114, 117

[56] References Cited

U.S. PATENT DOCUMENTS

| Re. 15,578 | 4/1923 | Harley | 74/325 |
|---|---|---|---|
| 1,628,598 | 5/1927 | Bird et al. | 74/325 X |
| 1,768,119 | 6/1930 | Contal et al. | 74/351 |
| 2,911,841 | 11/1959 | Miller | 74/342 |
| 3,178,955 | 4/1965 | Enders et al. | 74/369 |
| 3,396,593 | 8/1968 | Moores | 74/371 |
| 3,680,642 | 8/1972 | Kirn et al. | 74/22 A X |
| 3,785,443 | 1/1974 | Armbruster | 173/48 |
| 3,834,468 | 9/1974 | Hettich et al. | 173/48 |
| 3,955,628 | 5/1976 | Grözinger et al. | 173/48 X |
| 3,964,332 | 6/1976 | Schnizler | 74/325 |
| 4,027,546 | 6/1977 | Alessio | 74/325 |
| 4,098,351 | 7/1978 | Alessio | 173/48 X |

FOREIGN PATENT DOCUMENTS

| 143482 | 8/1903 | Fed. Rep. of Germany . | |
|---|---|---|---|
| 1450899 | 2/1969 | Fed. Rep. of Germany | 74/325 |
| 1625179 | 6/1970 | Fed. Rep. of Germany | 74/325 |
| 2162341 | 6/1973 | Fed. Rep. of Germany | 74/325 |
| 1190810 | 5/1970 | United Kingdom | 74/325 |

Primary Examiner—Wm. Carter Reynolds
Attorney, Agent, or Firm—Walter Ottesen; Ronald B. Sherer; Edward D. Murphy

[57] ABSTRACT

A multi-speed hammer-drill has a rotary-reciprocatory output spindle journaled in its housing. A fixed hammer member is mounted about the spindle in a forward portion of the housing and a cooperating hammer member is carried on the spindle. A cam member cooperates with the rearward end of the spindle for selectively changing between drilling and hammer-drilling modes. A three-speed transmission includes an axially-shiftable gear member carried by the spindle and disposed axially between the cam member and the cooperating hammer members with two non-axially movable gears freely rotatably mounted on said spindle one on each side of the axially-shiftable gear. A key is received in a longitudinal keyway in the spindle and keys the axially-shiftable gear member to the spindle. The key has a length substantially equal to the axial distance between the non-axially movable gears for maintaining a spaced relationship therebetween. The keyway is longer than the key to allow the key to slide axially relative to the keyway to accommodate reiprocatory movement of the spindle in the hammer-drilling mode. The axially-shiftable gear serves to provide a direct torque couple between an idler shaft and the spindle, or as a clutch for axially engaging either non-axially movable gear.

7 Claims, 7 Drawing Figures

Low Speed

Intermediate Speed

High Speed

COMPACT MULTI-SPEED HAMMER-DRILL

CROSS-REFERENCES TO RELATED APPLICATIONS

This application is a continuation-in-part of copending application Ser. No. 297,015 filed Aug. 28, 1981, now abandoned, which is a continuation-in-part of application Ser. No. 60,437 filed July 25, 1979 and now abandoned.

BACKGROUND OF THE INVENTION

The prior art of hammer-drills has been very highly developed over the years. These tools usually have a floating rotary-reciprocatory output spindle journaled in the housing for driving a suitable tool bit coupled thereto. In operation, the spindle is retracted axially within the housing and against the force of a suitable resilient means, upon engagement of the tool bit with the work and a manual bias force exerted by the operator on the tool. A fixed hammer member is secured in the housing, and a movable hammer member is carried by the spindle. The movable hammer member has a ratcheting engagement with the fixed hammer member to impart a series of vibratory impacts to the spindle in the hammer-drilling mode of operation. A shiftable means acts upon the spindle to change from the "drilling" mode to the "hammer-drilling" mode, and vice versa. In the drilling mode, the shiftable means moves the spindle forwardly in the housing by a sufficient amount, such that upon the subsequent retraction of the spindle within the housing (due to engagement of the tool bit with the work and the manual bias force exerted by the operator on the tool) the cooperating hammer members are spaced too far apart and hence do not engage each other. In the hammer-drilling mode, however, the spacing between the ratcheting teeth is reduced, and the cooperating hammer members impart their vibratory impacts to the spindle. Additionally, the art has disclosed various configurations of a two-speed or multi-speed transmission for use with hammer-drills. The cooperating hammer members, the shiftable means, and the multi-speed transmission thus constitute three essential mechanisms of a multi-speed hammer-drill.

In the prior art, of which I am aware, these three mechanisms of a multi-speed hammer-drill have been mounted at various locations within the tool housing; and not all have been centered coaxially about the output spindle or directly adjacent thereto. As a result, the multi-speed hammer-drills of the prior art have been unduly complicated, hence somewhat expensive, as well as cumbersome and awkward to use.

SUMMARY OF THE INVENTION

It is an object of the present invention to provide a compact multi-speed hammer-drill, one that is economical to manufacture, convenient to use, and reliable in its operation.

It is another object of the present invention to provide a multi-speed hammer-drill in which the three essential mechanisms, namely, the cooperating hammer members, the shiftable means, and the multi-speed transmission, are all disposed in coaxial relationship to (or closely adjacent to) the output spindle, thereby providing a compact and reliable design.

It is yet another object of the present invention to provide a compact multi-speed hammer-drill, in which an axially-shiftable gear member is carried by the output spindle and is disposed axially between the cooperating hammer members and the shiftable means.

In accordance with the teachings of the present invention, a rotary-reciprocatory output spindle is journaled in the housing and has a limited axial floating movement therein. A fixed hammer member is mounted concentrically about the spindle and is retained in a forward portion of the tool housing. A movable hammer member is carried by the spindle and cooperates with the fixed hammer member to deliver vibratory impacts to the spindle in the hammer-drilling mode of operation. A shiftable means is carried by the housing and engages an inner portion of the spindle (remote from the hammer members) for switching from the drilling mode of operation to the hammer-drilling mode, and vice versa. A three-speed transmission is provided for enhancing the convenience and utility of the hammer-drill. This transmission includes an intermediate shaft journaled in the housing and having different-sized first, second and third idler gears mounted thereon for cooperation with different-sized first, second and third output gears, respectively, on the spindle. The first and third output gears are freely rotatable on the spindle. The first output gear is disposed adjacent to the hammer members and is constantly in mesh with the first idler gear. The third output gear is disposed adjacent to the shiftable means and is constantly in mesh with the third idler gear. The second output gear is in mesh with the second idler gear in one of the three speeds of operation. A keying means is disposed between the second output gear and the spindle, thereby providing for conjoint rotation in unison. The second output gear is shiftable axially in either direction along the spindle to engage the first and third output gears, respectively. In its axially-shifted position, the second output gear is coupled to the first or third output gears, respectively, thereby coupling the first or third output gears, respectively, to the spindle.

In accordance with the further teachings of the present invention, the second output gear is keyed to the spindle by a longitudinal key received in a complementary longitudinal slot formed externally on the spindle. The key engages the respective inner faces of the first and third output gears, thereby maintaining the predetermined axial spacing between these gears; and in conjunction with suitable abutment means in the housing, assures that these output gears are constrained against axial movement and remain constantly in mesh with respective idler gears on an intermediate shaft. Additionally, the keyway extends axially beyond the key, and radially within the hub of the third output gear, thereby accommodating the rotary-reciprocatory movement of the floating spindle in all three operating speeds of the hammer-drill.

These and other objects will become apparent from a reading of the following specification, taken in conjunction with the enclosed drawings.

DESCRIPTION OF THE PREFERRED EMBODIMENT

Figure 1:
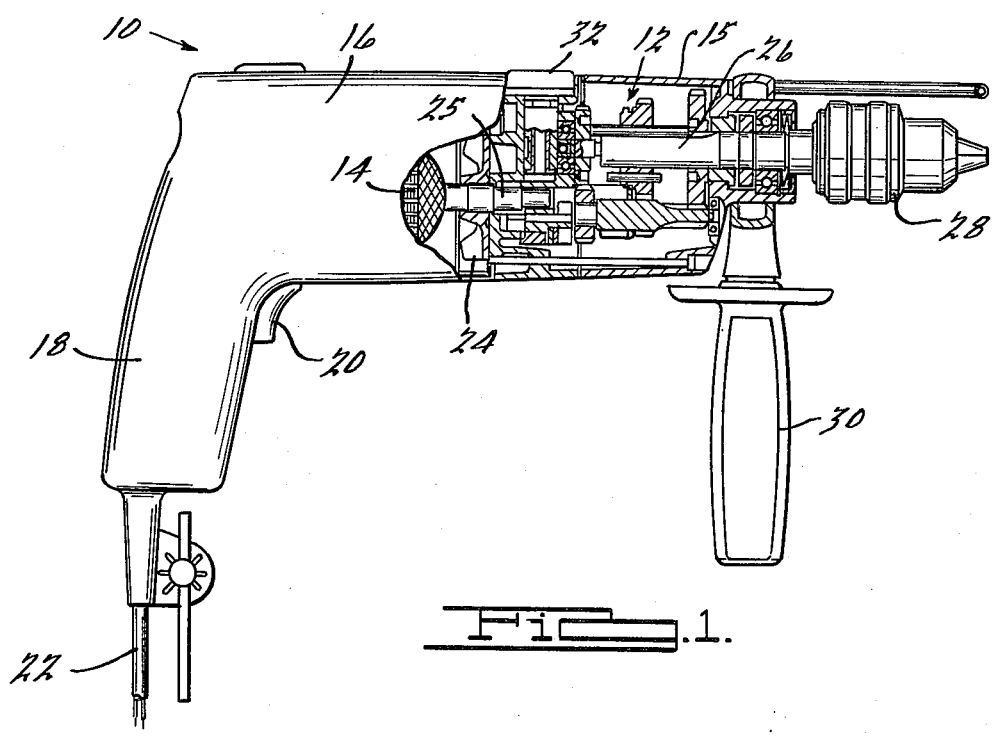
FIG. 1 is a side elevational view, with certain parts broken away and sectioned, illustrating a preferred embodiment of the compact multi-speed hammer-drill of the present invention.

With reference to FIG. 1, there is illustrated a compact multi-speed hammer drill 10 with which the teachings of the present invention may find more particular utility. The hammer drill 10 generally comprises a motor 14 (partly shown) disposed within a housing 16. The housing has a pistol-grip handle 18 provided with a trigger switch 20. The electrical power to the tool 10 is supplied via the usual cord 22 extending from the bottom of the handle 18. A cooling fan 24 is mounted on the shaft 25 of the motor 14. A gear case 15 is secured forwardly of the housing 16 (or is formed integrally therewith). A floating rotary-reciprocatory output spindle 26 is journaled in the gear case 15. The spindle 26 is driven by the motor 14, and as hereinafter described, the drive includes a three-speed transmission 12. The spindle 26 extends forwardly beyond the front of the gear case 15, and a chuck 28 is mounted on the spindle for retaining a drill bit (or other suitable implement) therein. For improved operator control, an additional depending handle 30 is mounted to the front end of gear case 15. Finally, the shiftable means for selecting either the "drill" or "hammer-drill" mode of operation, respectively, includes a rotatable knob 32 accessible through an opening in the top of the housing 16.

Figure 2:
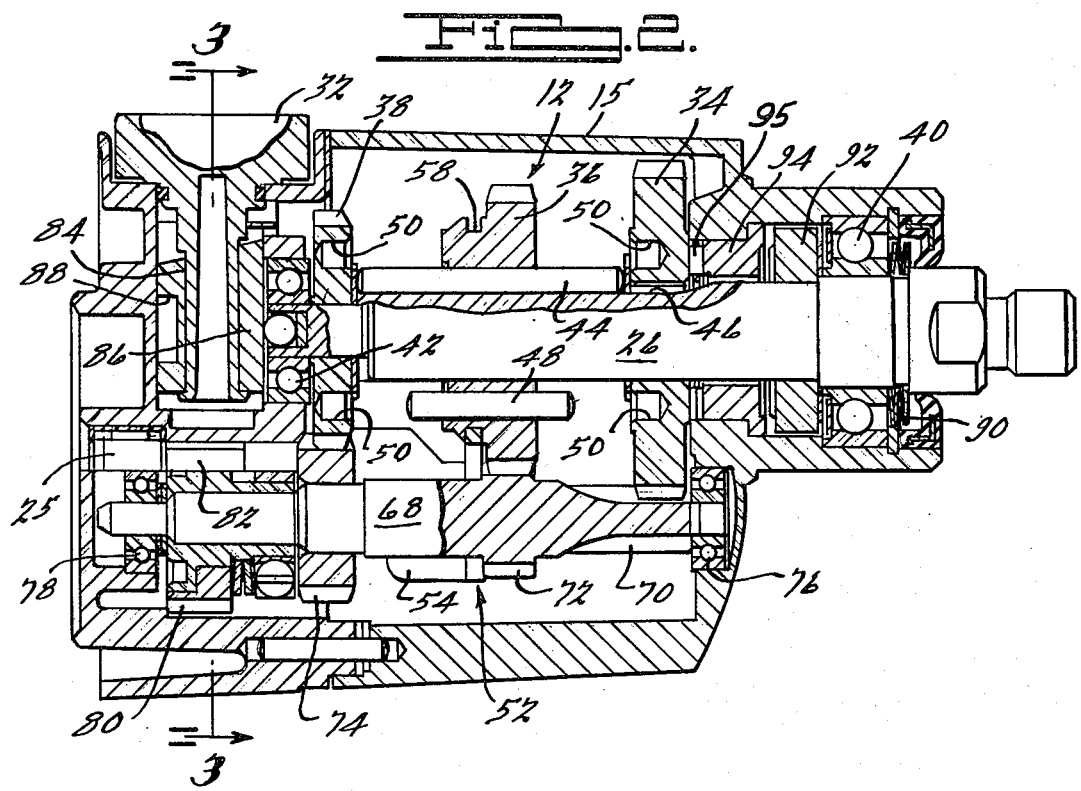
FIG. 2 is an enlarged longitudinal section of a portion of FIG. 1, showing the shiftable means, the multi-speed transmission, and the cooperating hammer members, all of which are disposed in coaxial relationship with (or closely adjacent to) the rotary-reciprocatory output spindle, thereby maximizing the simplicity and compactness of the overall tool design.

With reference to FIG. 2, the three-speed transmission 12 includes first, second and third output gears 34, 36 and 38, respectively, mounted on the spindle 26. These gears are of different size and correspond to the low, intermediate and high speed operation of the transmission, respectively. The first output gear 34 and the third output gear 38 are freely rotatably mounted on the output spindle 26. The spindle is journalled in respective ball bearings 40 and 42 mounted in the forward end and rear wall, respectively, of the gear case 15. The second (intermediate speed) gear 36 is keyed to the spindle 26 by means of a longitudinal spline or key 44 received within a longitudinal slot 46 formed externally on the spindle 26.

In accordance with the further teachings of the present invention, the key 44 engages the respective inner faces of the first and third output gears (34, 38), thereby maintaining the predetermined axial spacing between these gears. Gear 34 is constrained on its outer face by a first abutment means 95 in the housing associated with the front wall of gear case 15 and adjacent a fixed hammer member 94 as can be seen in FIGS. 2, 5, 6 and 7, and by key 44 which bears against the inner face of gear 34. Gear 38 is constrained on its outer face by the inner race of ball bearing 42 in the rear wall of gear case 15, the bearing constituting a second abutment means in the housing, and by key 44 which bears against the inner face of gear 38. Additionally, and as shown more clearly in FIG. 2, longitudinal slot 46 extends axially by an amount greater than the length of the key, radially within the hub of gear 34, and terminates short of the fixed hammer member 94.

With further reference to FIG. 2, the second (intermediate speed) gear 36 carries one or more pins 48. Pin 48 is radially-spaced from the spindle 26 and protrudes from both sides of gear 36. One or more corresponding pockets or detents 50 are formed in the inner face of the first gear 34 and the third gear 38, respectively. The pin 48 in rear 36 is received within its respective detent 50, when the gear 36 is shifted axially along the spindle 26 to be juxtaposed with either the gear 34 or the gear 38.

Figure 4:
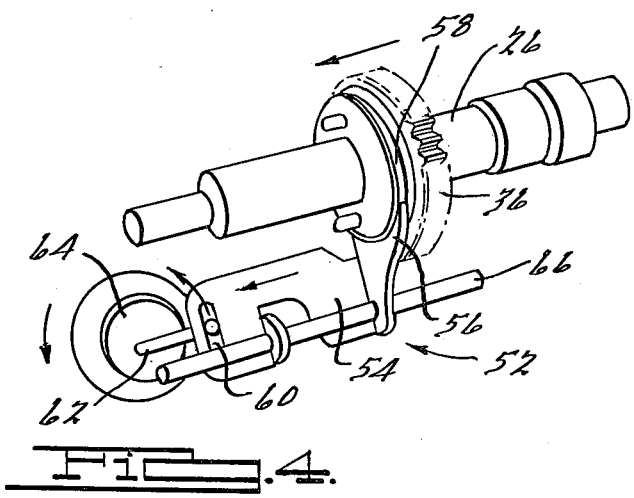
FIG. 4 is a diagrammatic perspective view, showing the means for shifting the second output gear axially along the spindle to change the speed of operation.
Figure 3:
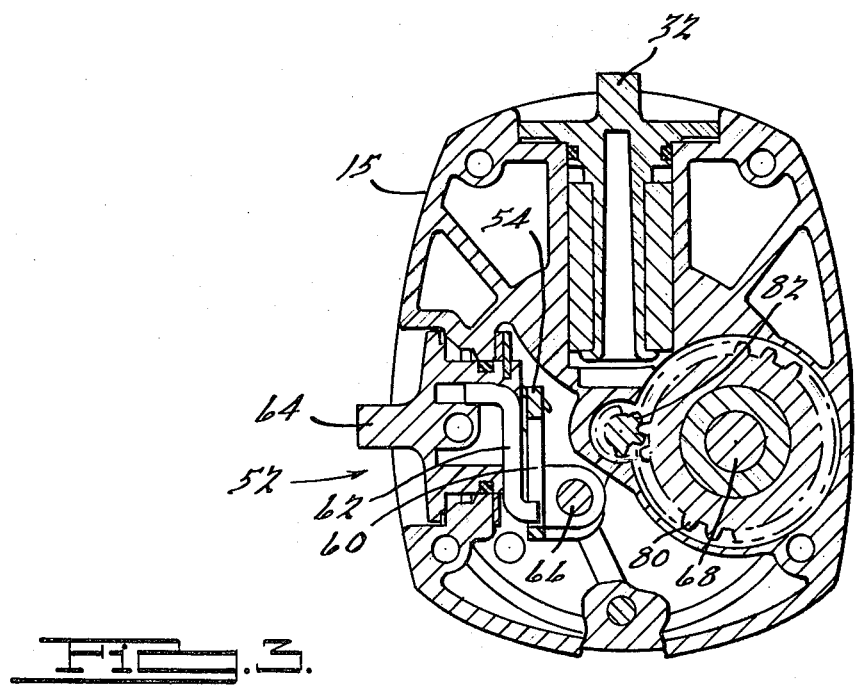
FIG. 3 is a transverse section view, taken along lines 3—3 of FIG. 2.

With reference to FIGS. 3 and 4, the axial position of gear 36 is controlled by a suitable mechanism 52. This mechanism 52 comprises a guide fork 54 having prongs 56 that engage a circumferential groove 58 formed in the axially-shiftable gear 36. Guide fork 54 includes a flat portion having a slot 60 formed therein to receive one end of an S-shaped pin 62. The other end of pin 62 is eccentrically carried by a knob 64 which is rotatable through an angle of 180°. Rotation of the knob 64 rotates S-shaped pin 62 causing guide fork 54 to slide along guide pin 66 to one of three different positions. These positions correspond to the three respective positions of the axially-shiftable gear 36, as hereinafter described.

With reference again to FIG. 2, the first (low speed) gear 34 and the third (high speed) gear 38 are constantly in mesh with first and third idler gears, 70 and 74 respectively, mounted on an intermediate shaft 68. Shaft 68, which preferably is parallel to spindle 26, is journalled in the housing by means of a pair of ball bearings 76 and 78 mounted, respectively, in the front and rear walls of gear case 15. Preferably, the first idler gear 70 comprises a pinion formed on shaft 68. A second idler gear 72 is carried by shaft 68 (or suitably formed thereon) and engages the second output gear 36, when the transmission is in the position shown in FIGS. 2 and 6. Finally, the forward portion of shaft 68 carries a gear 80 engaging a pinion 82 on the motor shaft 25, thereby completing the drive.

As noted previously, the hammer drill 10 is adapted to operate in either one or two modes: the "hammer drill" mode or the "drill" only mode. Mode selection is made by a shiftable means including the knob 32. Knob 32 has a shaft 84 that carries a cam member 86 formed with a recess 88 in a radial segment thereof. Cam 86 engages the inner end of the floating output spindle 26, adjacent to the third output gear 38. Thus, as shown in FIG. 2, the shiftable means is disposed adjacent to the third output gear, and preferably, operates against the end of the spindle, exerting a force substantially coaxial with the axis of the spindle.

The pair of cooperating hammer members, 92 and 94, are located in the forward portion of gear case 15, as further shown in FIG. 2. Member 92 is the movable hammer member and is carried by the spindle 26 for conjoint rotation therewith. Member 94 is the fixed hammer member and is press-fitted or otherwise secured within the gear case 15. The hammer members 92 and 94 have cooperating ratcheting teeth, which are conventional, for delivering the desired vibratory impacts to the output spindle in the hammer-drill mode of operation. A spring 90 is provided to forwardly bias the spindle 26, and as shown, a slight gap is thereby created between the opposed faces of the hammer members 92 and 94 (prior to operation of the tool).

Thus, it will be appreciated that when the mode-selection knob 32 is rotated to the position illustrated in FIG. 2, the cam member 86 will abut against the rearward or inner end of output spindle 26, thereby moving the spindle sufficiently forward within the housing so as to preclude a ratcheting or hammering engagement between the stationary hammer member 94 and the movable hammer member 92, when the spindle is subsequently retracted within the housing by the application of a manual bias pressure exerted by the operator in using the tool. Accordingly, in this position, the tool will operate in the "drill" only mode. However, upon rotation of knob 32 by 180 degrees, recess 88 in cam member 86 will become alined with the rearward end of output spindle 26. In this position, and when the tool bit is pressed against the workpiece, spindle 26 will move rearwardly against the bias of spring 90, thereby enabling the teeth of hammer members 92 and 94 to mutually engage, and thereby imparting a series of vibratory impacts to the spindle 26 (as the spindle continually rotates).

Figure 5:
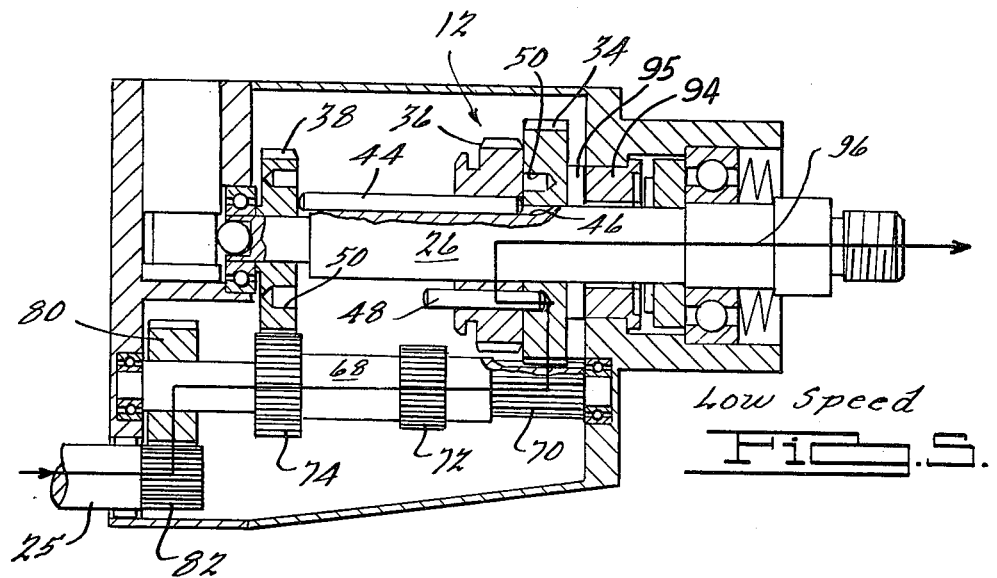
FIG. 5 is a schematic view, showing the three-speed transmission in its low-speed position.
Figure 6:
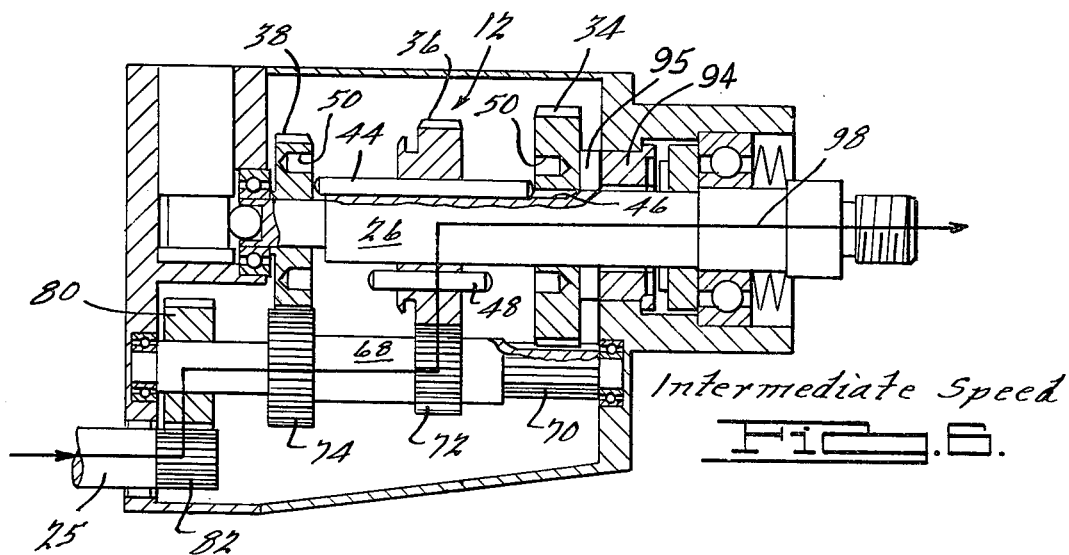
FIG. 6 is a schematic view, corresponding to FIG. 5, but showing the transmission in its intermediate-speed position.
Figure 7:
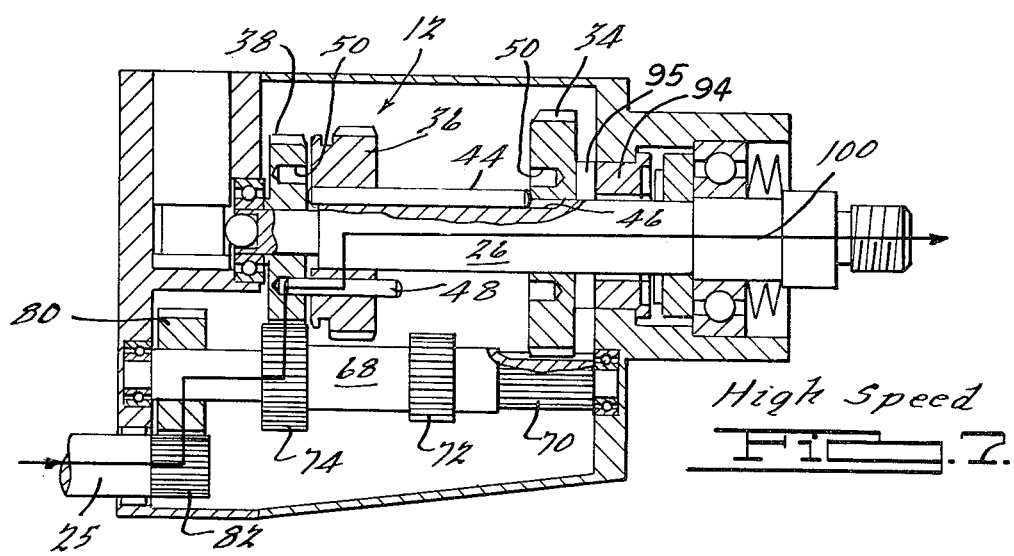
FIG. 7 is a schematic view, corresponding to FIG. 5, but showing the transmission in its high-speed position.

With reference to FIGS. 5, 6 and 7, the operation of the transmission 12 will become readily apparent. In FIG. 5, the knob 64 (of FIG. 4) has been rotated to move the second output gear 36 axially into juxtaposition with the first output gear 34. In this position, the pin 48 engages within detent 50, thereby coupling gear 36 to gear 34, and hence gear 34 to spindle 26, for conjoint rotation. Accordingly, the torque or drive is from the motor shaft 25 to pinion 82, gear 80, intermediate shaft 68, idler pinion 70, gear 34, gear 36, and longitudinal key 44 to output spindle 26 (as indicated by the solid line designated 96). This is the low-speed position of transmission 12.

With reference to FIG. 6, the second output gear 36 has been shifted axially to its intermediate position and is engaged directly with the second idler gear 72 on shaft 68. Accordingly, the drive is now from the motor shaft 25 to pinion 82, gear 80, shaft 68, gear 72, gear 36, and longitudinal key 44 to output spindle 26 (as indicated by the solid line designated 98). This is the intermediate speed position of transmission 12.

With reference to FIG. 7, the gear 36 has been shifted axially into juxtaposed relationship with the third output gear 38. Pin 48 in gear 36 is received within detent 50 formed in the face of gear 38, thereby causing gear 38 to rotate with gear 36 and spindle 26. Accordingly, the drive is now from the motor shaft 25 to pinion 82, gear 80, shaft 68, gear 74, gear 38, gear 36, and longitudinal key 44 to output spindle 26 (as indicated by the solid line designated 100). This is the high-speed position of transmission 12.

In the low and high-speed positions of the transmission 12, as shown in FIGS. 5 and 7, respectively, the second output gear 36 serves as a clutch to transmit torque from gear 34 and gear 38, respectively, to the output spindle 26; whereas in the intermediate speed position (as shown in FIG. 6) gear 36 serves as the primary output gear, transmitting torque directly from shaft 68 to spindle 26.

Of special significance is the manner in which the present three-speed transmission 12 accommodates the floating reciprocatory movement of the rotating output spindle 26 in the hammer-drilling mode of operation, while maintaining proper alinement between the output gears on the spindle 26 and the idler gears on the shaft 68. More specifically, it is very desirable to have the first and third output gears 34 and 38, respectively, remain in a fixed axial position relative to shaft 68 and its respective idler gears 70 and 74, while the output gears 34 and 38 are freely rotatably mounted on the spindle 26.

In this regard, the multiple functions served by longitudinal key 44 will be readily appreciated. Key 44 not only transmits torque from the second axially-shiftable gear 36 to output spindle 26 (in all three speed positions of the transmission 12) but key 44 also serves to constrain axial movement of the first and third output gears 34, 38 and to maintain the predetermined axial spacing therebetween. Gear 34, as previously noted, is constrained against axial movement by the key 44 and abutment means associated with an interior wall of gear case 15. Gear 138, as previously noted, is constrained against axial movement by the key 44 and the inner race of ball bearing 42. As a result, output gears 34 and 38 are restrained against axial movement and remain constantly in mesh with their respective idler gears, 70 and 74, while being freely rotatable on the output spindle.

At the same time, the rotary-reciprocatory floating movement of the output spindle 26 is fully accommodated in all three-speed positions of the tranmission 12. While the length of key 44 is equal to the axial distance between gears 34 and 38, longitudinal slot 46 in spindle 26 extends beyond the key 44 and radially into the hub of gear 34, terminating therein short of the fixed hammer member 94 (as shown more clearly in FIG. 8). With this arrangement, when floating spindle 26 reciprocates, key 44 remains stationary in the axial direction, maintains its sliding engagement in slot 46, and continues to transmit torque to the spindle 26.

Thus, a compact multi-speed hammer-drill is provided, one that is simple and economical to produce, convenient to use, and reliable in its operation. The cooperating hammer members, the shiftable means for selecting either the "drill" or "hammer drill" mode of operation, and the multi-speed tranmission are not scattered around the housing, but rather, are concentrically disposed in relation to the output spindle or, as in the case of the shiftable means, directly adjacent to the spindle. Moreover, the floating movement of the rotary-reciprocatory output spindle is fully accommodated at all three speeds of the hammer-drill, while the pair of respective output gears (freely rotatable on the spindle) are restrained against axial movement and thus remain constantly in mesh with their respective idler gears.

Obviously, many modifications may be made without departing from the basic spirit of the present invention. Accordingly, it will be appreciated by those skilled in the art, that within the scope of the appended claims, the ivention may be practiced other than has been specifically described herein.

I claim:

1. In a compact multi-speed hammer-drill having a housing with a motor therein, the hammer-drill having a "drilling" mode of operation and a "hammer drilling" mode, the combination of a rotary-reciprocatory output spindle journaled in the housing and having a limited axial floating movement therein, a fixed hammer member mounted concentrically about the spindle and retained in a forward portion of the housing, a movable hammer member carried on the spindle, concentrically therewith, and cooperating with the fixed hammer member to deliver vibratory impacts to the spindle in the hammer-drilling mode of operation, shiftable means mounted in the housing and engaging an inner portion of the spindle remote from the hammer members for switching from the drilling mode to the hammer-drilling mode, and vice versa, and a three-speed transmission comprising an intermediate shaft journaled in the housing, respective first, second and third idler gears of different sizes on the shaft for conjoint rotation therewith, respective first, second and third output gears of different sizes on the spindle, the first and third output gears being freely rotatably mounted on the spindle, the first output gear being disposed adjacent to the cooperating hammer members and being constantly in mesh with the first idler gear, the third output gear being disposed adjacent to the shiftable means and being constantly in mesh with the third idler gear, the second output gear being in mesh with the second idler gear in one of the three speeds of operation, keying means between the second output gear and the spindle for conjoint rotation therewith in all three speeds of operation, means for moving the second output gear axially in either direction along the spindle in juxtaposition to the first and third output gears, respectively, and means responsive to the juxtaposition of the second output gear to either the first and third output gears, respectively, for coupling either the first or third output gears to the spindle, respectively, thereby providing for two additional speeds of operation.

2. The combination of claim 1, wherein the keying means between the second output gear and the spindle comprises a longitudinal key disposed radially between the second output gear and the spindle, the spindle having a longitudinal slot formed externally thereon to receive the key, and the key engaging the respective inner faces of the first and third output gears, thereby maintaining an axial spacing therebetween, and thereby assuring that the first and third output gears will constantly remain in mesh with the first and third idler gears, respectively.

3. The combination of claim 2, wherein the longitudinal slot extends axially by an amount greater than the length of the key, and radially within the hub of first output gear, thereby accommodating the rotary-reciprocatory movement of the spindle at all three operating speeds of the hammer-drill.

4. The combination of claim 3, wherein said longitudinal slot terminates short of the fixed hammer member.

5. In a compact multi-speed hammer-drill having a housing with a motor therein, the hammer-drill having a "drilling" mode of operation and a "hammer-drilling" mode, the combination of a rotary-reciprocatory output spindle journaled in the housing and having a limited axial floating movement therein, a pair of hammer members, one fixed in the housing and the other carried by the spindle and cooperating with the fixed hammer member to deliver vibratory impacts to the spindle in the hammer-drilling mode of operation, shiftable means mounted in the housing for switching from the drilling mode to the hammer-drilling mode, and vice versa, a multi-speed transmission including an intermediate shaft journaled in the housing and having at least a pair of idler gears of different size mounted thereon for conjoint rotation therewith, a corresponding pair of output gears of different size freely rotatably mounted on the spindle and constantly meshing with the pair of idler gears, respectively, each of the output gears having respective inner and outer faces, a member carried by the spindle between the pair of output gears, keying means between the member and the spindle for conjoint rotation therewith, said keying means comprising a longitudinal key disposed radially between the member and the spindle, the spindle having a longitudinal keyway formed extenally thereon to receive the key, the key engaging the respective inner faces of the output gears, thereby maintaining an axial spacing between the output gears, means for shifting the member axially along the spindle to engage one or the other of the output gears, respectively, thereby coupling one or the other of the output gears to the spindle, respectively, for establishing at least two different speeds of operation, first abutment means in the housing and engaging the outer face of one of the output gears, and second abutment means in the housing and engaging the outer face of the other output gear, whereby the output gears are restrained against axial movement in the housing, and whereby the constant meshing engagement of the output gears with the respective idler gears is assured, and the longitudinal keyway extending axially beyond the key and within the hub of one of the output gears, thereby accommodating the floating axial movement of the rotary-reciprocatory output spindle in the hammer-drilling mode of operation for both speeds of operation.

6. The combination of claim 5, wherein the spindle has an inner portion journaled in a ball bearing in the housing, and wherein the second abutment means comprises the inner race of the bearing.

7. A hammer-drill having "drilling" and "hammer-drilling" modes of operation, comprising:
 a housing with a motor therein;
 a rotary-reciprocatory output spindle journaled in the housing;
 a fixed hammer member mounted about the spindle and retained in a forward portion of the housing;
 a movable hammer member carried on the spindle and cooperating with the fixed hammer member to deliver vibratory impacts to the spindle in the hammer-drilling mode of operation;
 means, mounted in the housing and cooperating with said spindle, for selectively changing the hammer-drill from the drilling mode to the hammer-drilling mode, and vice versa;
 a three-speed transmission comprising an intermediate shaft journaled in the housing, respective first, second and third idler gears on said shaft for conjoint rotation therewith, respective first, second and third output gears on said spindle and disposed axially between said mode changing means and the cooperating hammer members, said first and third output gears being freely rotatably mounted on said spindle, said first output gear being disposed adjacent to the cooperating hammer members and being constantly in mesh with said first idler gear, said third output gear being disposed adjacent to said mode changing means and being constantly in mesh with said third idler gear, and said second output gear being in mesh with said second idler gear in one of the three speeds of operation;
 a longitudinal key disposed between said second output gear and said spindle for conjoint rotation therewith in all three speeds of operation, said key being received in a longitudinal keyway formed in said spindle;
 said keyway being axially longer than said key to allow said key to slide axially relative to said keyway to accommodate reciprocatory movement of said spindle in the hammer-drilling mode;

means for moving said second output gear axially along said spindle in either direction into juxtaposition to said first and third output gears, respectively; and means responsive to the juxtaposition of said second output gear to said first and third output gears, respectively, for coupling either said first or third output gears, respectively, to said spindle.

* * * * *